United States Patent [19]
> Madden

[11] Patent Number: 4,747,543
[45] Date of Patent: May 31, 1988

[54] NOZZLE FLAP COOLING LINER

[75] Inventor: William M. Madden, Palm Springs, Fla.

[73] Assignee: United Technologies Corporation, Hartford, Conn.

[21] Appl. No.: 38,075

[22] Filed: Apr. 14, 1987

[51] Int. Cl.[4] .............................................. F02K 1/38
[52] U.S. Cl. .......................... 239/127.3; 239/265.17; 60/266; 60/271; 244/117 A
[58] Field of Search ............... 60/266, 271, 265, 262, 60/752, 760; 239/127.1, 127.3, 265.17, 265.19, 265.35, 265.37; 244/117 A

[56] References Cited

U.S. PATENT DOCUMENTS

| | | | |
|---|---|---|---|
| 2,955,415 | 10/1960 | Long | 60/266 |
| 3,066,702 | 12/1962 | Tumavicus | 138/111 |
| 3,231,197 | 1/1966 | Strom | 239/265.17 |
| 3,321,154 | 5/1967 | Downs | 244/117 A |
| 3,848,697 | 11/1974 | Jennot et al. | 181/33 |
| 3,979,065 | 9/1976 | Madden | 239/127.3 |

Primary Examiner—Andres Kashnikow
Assistant Examiner—Chris Trainor
Attorney, Agent, or Firm—Edward L. Kochey, Jr.

[57] ABSTRACT

A cooled liner assembly for a nozzle has a plurality of longitudinally aligned support hinges secured to a support plate. A thin plate liner of arcuate shape is hinged to the support hinges with cooling air supplied between the liner and support plate. The liner is lightweight resisting the differential pressure of 25 psi in membrane hoop stresses, with components experiencing bending moments remote from the hot gas inside the nozzle.

8 Claims, 3 Drawing Sheets

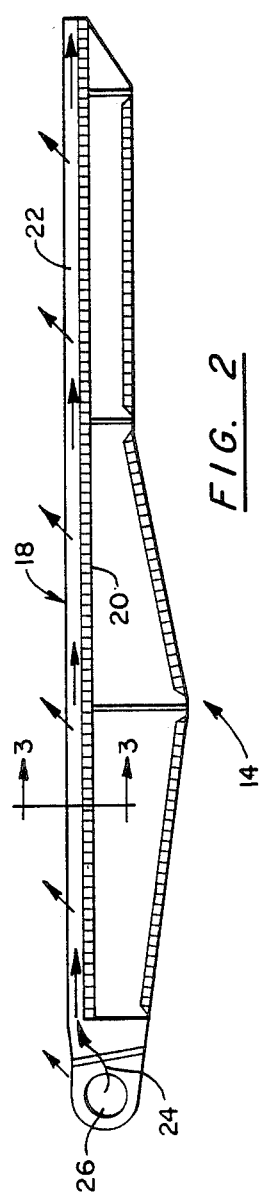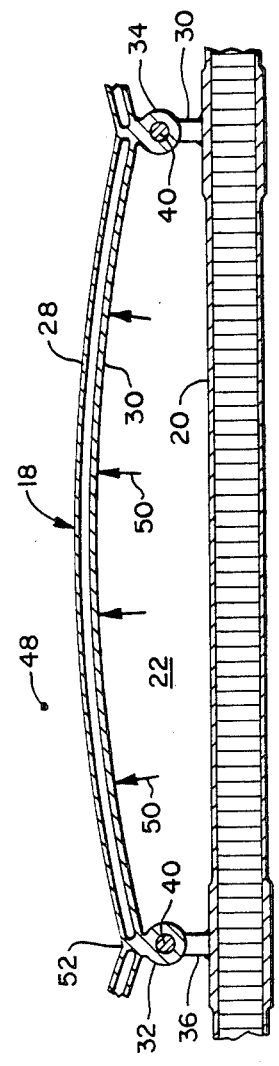

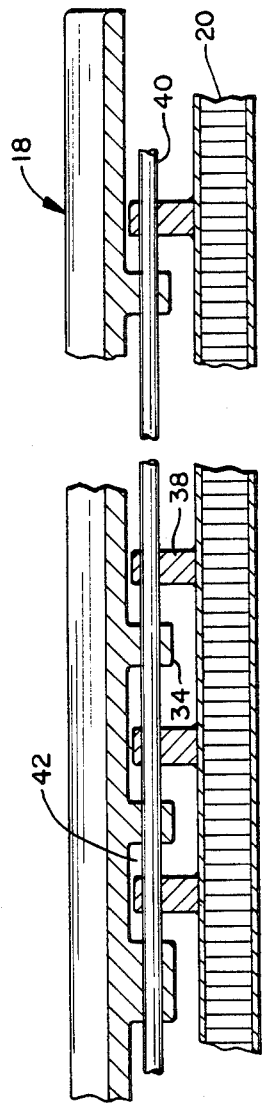
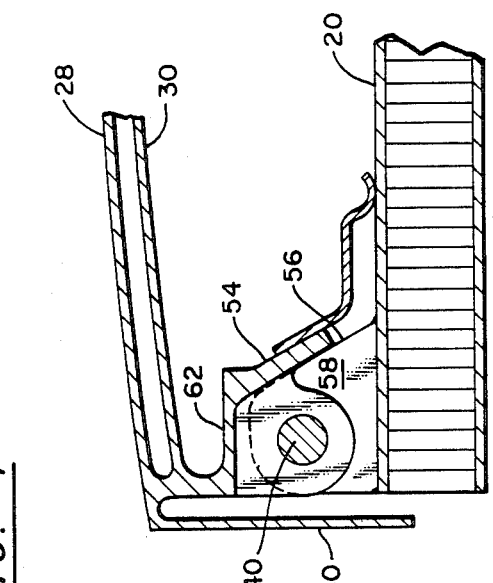
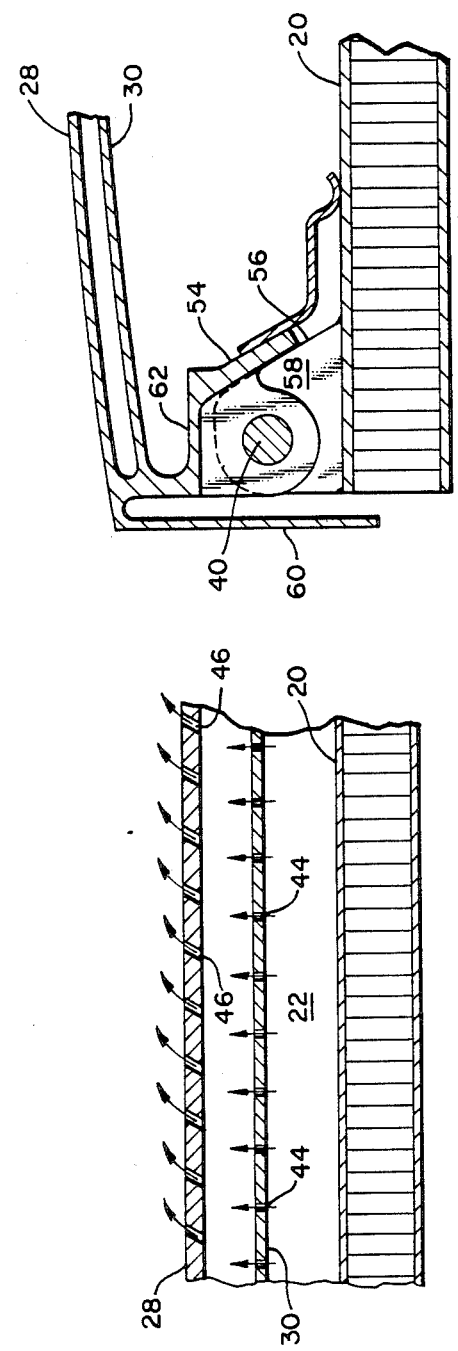

NOZZLE FLAP COOLING LINER

The Government has rights in this invention awarded by the Department of the Air Force.

TECHNICAL FIELD

The invention relates to aircraft gas turbine engines and in particular to a light weight cooling liner for nozzle flaps.

BACKGROUND ART

Gas turbine engine discharge nozzles may include variable area and/or variable direction flaps. Such flaps are substantially planular and rotate between opposed parallel sidewalls of the nozzle.

The flaps must tolerate high temperatures in the order of 1500 F. during operation. It is conventional to supply a liner and cooling air to protect the underlying structure from the high temperature gases. Such liners have usually been relatively massive because of the attempt to use flat surfaces and the relatively thick walls of the liner which are required to resist the pressure of cooling air. Other liners have been massive because of the need to resist buckling caused by temperature differential between the liner and the underlying structure.

The thick and massive walls not only pose the potential of substantial strains, but also add weight not only to the aircraft but to the flap which must be maneuvered.

It is an object of the invention to cool the inner surface of a flap in a manner which imposes minimum weight on a aircraft and minimum thermal and pressure stresses.

DISCLOSURE OF THE INVENTION

Planular support structure for a gas turbine exhaust nozzle flap has a plurality of rows of support hinges secured to it. A thin plate flap liner also has a plurality of hinges which are aligned with the support hinges, with a hinge pin passing therethrough. There are means for supplying cooling air under pressure between the support plate and the liner, and the liner is formed to have an arcuate shape between adjacent rows of hinges so that the pressure is resisted by hoop (membrane) stress in the liner. The liner includes an outer liner plate and an inner impingement plate that is closely spaced therefrom. The impingement plate has a plurality of openings for passing air and directing it against the liner plate while the liner plate has a plurality of angled openings for allowing air to pass therethrough to cool the plate and form a film inside the nozzle.

BRIEF DESCRIPTION OF THE DRAWINGS

FIG. 2 is a section through a flap showing the general flow of coolant air.

FIG. 3 is a section through the flap looking in the direction of gas flow.

FIG. 4 is a sectional view of the hinge and pin arrangement.

FIG. 5 is an illustration of the impingement cooling arrangement.

FIG. 6 is an illustration of a sectional view of the outermost row of hinges.

BEST MODE FOR CARRYING OUT THE INVENTION

Figure 1:
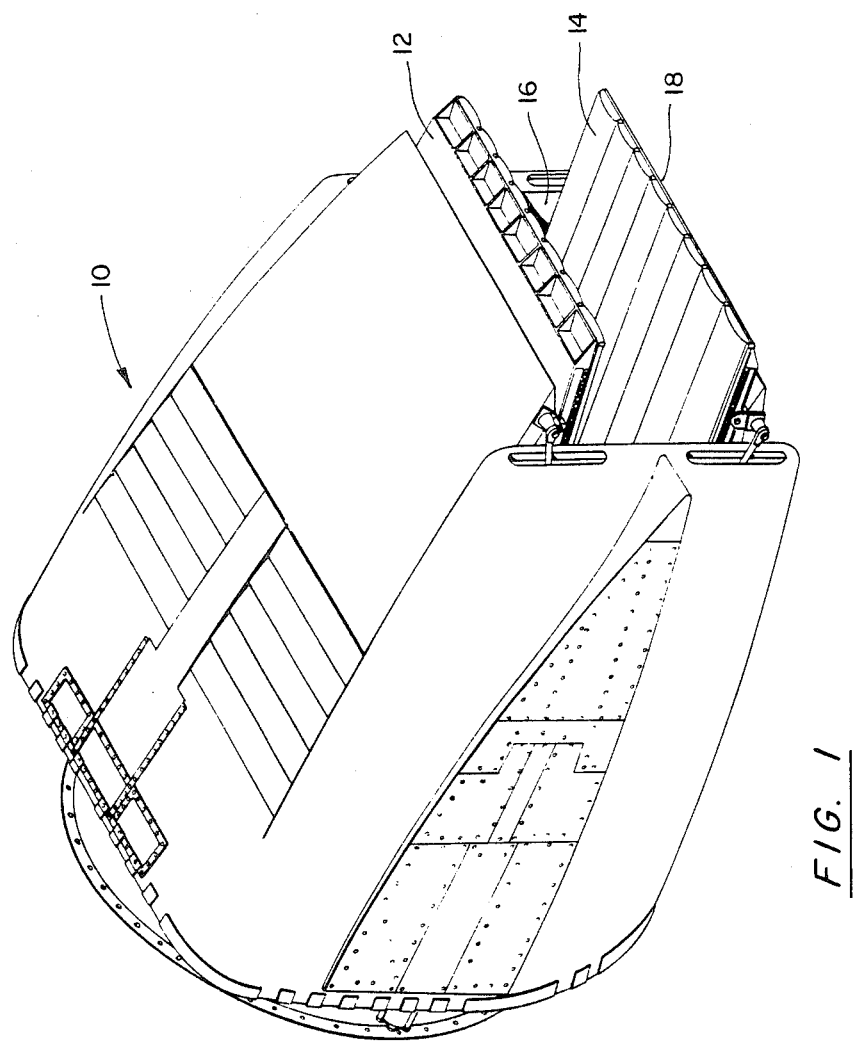
FIG. 1 is an isometric view of the moveable nozzle flap arrangement for a gas turbine engine.

In FIG. 1 there is illustrated a nozzle assembly 10 for a gas turbine engine including an upper moveable flap 12 and a lower moveable flap 14. These flaps may be rotated upwardly or downwardly sealing against sidewall 16. The portion of the nozzle exposed to the hot gases passing therethrough is covered by liner 18 which is spaced from honeycomb support structure 20 thereby forming a coolant plenum 22 therebetween.

As shown in FIG. 2 a flow of coolant 24 may enter through a pivot pin 26 into the interior of the moveable flap 14. That passes into plenum 22 for cooling of the liner 18 as described later.

As shown in FIG. 3 the thin plate liner 18 is actually comprised of a liner plate 28 and an impingement plate 30. Each is arcuate in form being a portion of a circle with plate 28 having a 10 inch outside radius and plate 30 having an 8.98 inch inside radius there being a space of 0.98 inches between the plates. Each plate is 0.020 inches thick and subending an arc of about 24 degrees.

Increasing the radius to cover the same width results in a liner subtended arc, a larger diameter cylinder and therefore increased hoop (membrane) stress. Decreasing the radius results in more penetration into the nozzle gas flow area, reducing the flow area. The preferred range is a subtended arc of from 15 to 30 degrees.

Hinges 32 and 34 are secured to the liner being in rows spaced 4.12 inches apart. Support plate 20 in the form of a titanium honeycomb structure has mounted thereon rows of hinges 36 and 38 which are in longitudinal alignment with the rows of hinges 32 and 34. A hinge pin 40 secures the hinges together.

As best seen in FIG. 4 which is the section through the hinge assembly, expansion clearances 42 are provided between the hinges 38 and 34 to permit longitudinal expansion of the liner 18 with respect to the support plate 20. The cooling arrangement immediately adjacent to the liner is illustrated in FIG. 5 where air from plenum 22 passes through perpendicular holes 44 to impinge against liner 28. The air thereafter passes through the angled holes 46 to form a film cooling the internal surface of the liner.

Cooling of this nature compared to convection parallel flow cooling has the advantage of being relatively insensitive to the variations in spacing between the plates. In operation the liner 28 will be at a relatively high temperature on the order of 1500 F. as compared to a lower temperature in the order of 700 F. for the impingement plate. Differential expansion of the two will take place resulting in some variation in the gap. Accordingly, this particular cooling arrangement is tolerant of such variation.

The pressure within plenum 22 is about 33 psi as compared to 8 psi at location 48 within the nozzle itself. The force of the internal pressure indicated by lines 50 is everywhere perpendicular to the surface. Accordingly, the liner will react as a thin wall cylinder under internal pressure with all of the stress being hoop (membrane) stress, thereby avoiding bending stresses and permitting a thin wall lightweight liner. Should there be minor imperfections in the arc the thin wall permits straining to the arcuate form with only minimal stress. At the location of the hinges 32 and 34 there is a thickened wall section 52. The horizontal component of the hoop stresses on each side of this thickened section oppose one another and cancel while the vertical component of the hoop stress must be transferred down to the hinge. Accordingly, this thickened section, which has a reverse bend fairing into the arc of the liner, accepts this bending. This results in only a minor increase in weight for the few locations which require the increased thickness. The hinge and hinge pin are recessed away from the hot gases 48 thereby avoiding the need for exotic materials in the hinge pin and the support plate hinges 36 and 38.

FIG. 6 shows a hinge of the outermost rows of hinges where the force from plates 28 and 30 are not balanced by an adjacent pair of plates. An integral inwardly extending arm 54 secured to the plates is eccentrically located with respect to hinge pin 40 and abuts the surface 56 of hinge 58, which is secured to support plate 20. A side heat shield 60 further protects the high stress area 62 from high temperatures. The overturning moment is thereby resisted by the force between hinge 58 and arm 54.

I claim:

1. A cooled liner assembly for a gas turbine exhaust nozzle comprising:
   a planular support structure;
   a plurality of rows of support hinges secured to said support structure, each row in longitudinal alignment;
   a thin plate flap liner;
   a plurality of rows of flap hinges secured to said flap liner, each row in longitudinal alignment with a row of support hinges, with longitudinal clearance between said support hinges and said flap hinges for permitting relative longitudinal expansion of said liner with respect to said support plate;
   a hinge pin through each row of support hinges and the corresponding row of flap hinges;
   means for supplying cooling air under pressure between said support structure and said liner; and
   said liner formed to have an arcuate shape between adjacent rows of hinges, whereby coolant pressure is resisted by hoop (membrane) stress in said liner.

2. A cooled liner assembly as in claim 1:
   said arcuate shape being between 15 degrees and 30 degrees.

3. A cooled liner assembly as in claim 1:
   said thin plate flap liner including, an outer liner plate exposed to gases within said nozzle, an inner impingement plate closely spaced from said liner plate and having a plurality of openings for the passage of air and for directing the air against said liner plate, and said liner plate having a plurality of angled openings therethrough for passage of cooling air.

4. A cooling liner assembly as in claim 1:
   said liner having a section immediately adjacent said liner hinges of a thickness substantially greater than the thickness of said thin plate flap liner.

5. A cooled liner assembly as in claim 1:
   said hinges located between said thin plate flap liner and said support plate, whereby said hinges and hinge pin are not exposed to hot gases flowing through the nozzle.

6. A cooled liner assembly as in claim 1:
   said liner having a thicker section adjacent said hinges having a reverse curve and having the ends in alignment with the arcuate shape of said thin plate liner;
   said hinge integral with and recessed from said thicker section.

7. A cooled liner assembly as in claim 1:
   the outermost rows of flap hinges having flap abutment means thereon, eccentrically located with respect to said hinge pin; and
   a support abutment means secured to said support plate and abutting said flap abutment means.

8. A cooled liner assembly as in claim 5:
   the outermost rows of flap hinges having flap abutment means thereon, eccentrically located with respect to said hinge pin; and
   a support abutment means secured to said support plate and abutting said flap abutment means.

* * * * *